(12) United States Patent
Hoffman

(10) Patent No.: US 9,822,856 B2
(45) Date of Patent: Nov. 21, 2017

(54) MULTI-SPEED TRANSMISSION

(71) Applicant: Ford Global Technologies, LLC, Dearborn, MI (US)

(72) Inventor: Donald Edward Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 14/943,131

(22) Filed: Nov. 17, 2015

(65) Prior Publication Data

US 2016/0069431 A1 Mar. 10, 2016

Related U.S. Application Data

(62) Division of application No. 13/953,055, filed on Jul. 29, 2013, now Pat. No. 9,217,494.

(51) Int. Cl.
*F16H 3/44* (2006.01)
*F16H 3/62* (2006.01)
*F16H 3/66* (2006.01)
*F16H 37/04* (2006.01)

(52) U.S. Cl.
CPC ............ *F16H 3/663* (2013.01); *F16H 3/62* (2013.01); *F16H 3/66* (2013.01); *F16H 37/042* (2013.01); *F16H 2003/447* (2013.01); *F16H 2200/0065* (2013.01); *F16H 2200/0073* (2013.01); *F16H 2200/0078* (2013.01); *F16H 2200/201* (2013.01); *F16H 2200/2012* (2013.01); *F16H 2200/2023* (2013.01); *F16H 2200/2048* (2013.01)

(58) Field of Classification Search
None
See application file for complete search history.

(56) References Cited

U.S. PATENT DOCUMENTS

| | | | |
|---|---|---|---|
| 4,683,776 A | 8/1987 | Klemen | |
| 4,774,856 A | 10/1988 | Hiraiwa | |
| 5,176,592 A | 1/1993 | Nakawaki et al. | |
| 6,176,803 B1 | 1/2001 | Meyer et al. | |
| 6,955,627 B2 | 10/2005 | Thomas et al. | |
| 6,960,149 B2 | 11/2005 | Ziemer | |
| 6,984,187 B2 | 1/2006 | Biermann | |
| 7,686,730 B2 | 3/2010 | Baldwin | |

(Continued)

OTHER PUBLICATIONS

Chinese Office Action dated Jul. 29, 2017 for corresponding Application No. 201410366040.8, 6 Pages.

*Primary Examiner* — Jacob S Scott
(74) *Attorney, Agent, or Firm* — James Dottavio; Brooks Kushman P.C.

(57) ABSTRACT

A family of transmission gearing arrangements each establish at least one reverse gear ratio and between nine and fifteen forward gear ratios. A shiftable gearing arrangement establishes a variety of speed ratios between the input and a first shaft. In some embodiments, a fixed speed ratio is established upstream or downstream of the shiftable gearing arrangement. In reverse and low gear ratios, a low clutch couples the first shaft to the output. In the high gear ratios, a combining planetary gear set establishes a linear speed relationship between the first shaft, a second shaft rotating at a speed proportional to the input, and the output.

12 Claims, 8 Drawing Sheets

(56) References Cited

U.S. PATENT DOCUMENTS

| | | | |
|---|---|---|---|
| 7,850,569 B2* | 12/2010 | Seo | F16H 3/663 |
| | | | 475/281 |
| 8,177,674 B2 | 5/2012 | Baldwin | |
| 2004/0053736 A1* | 3/2004 | Usoro | F16H 3/66 |
| | | | 475/296 |
| 2005/0176550 A1 | 8/2005 | Bucknor et al. | |
| 2006/0040784 A1* | 2/2006 | Usoro | F16H 3/66 |
| | | | 475/275 |
| 2010/0062893 A1 | 3/2010 | Antonov | |
| 2013/0260949 A1 | 10/2013 | Fellmann et al. | |

\* cited by examiner

MULTI-SPEED TRANSMISSION

CROSS-REFERENCE TO RELATED APPLICATIONS

This application is a division of U.S. application Ser. No. 13/953,055 filed Jul. 29, 2013, now U.S. Pat. No. 9,217,494, issued Dec. 22, 2015, the disclosure of which is hereby incorporated in its entirety by reference herein.

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

DETAILED DESCRIPTION

Figure 1:
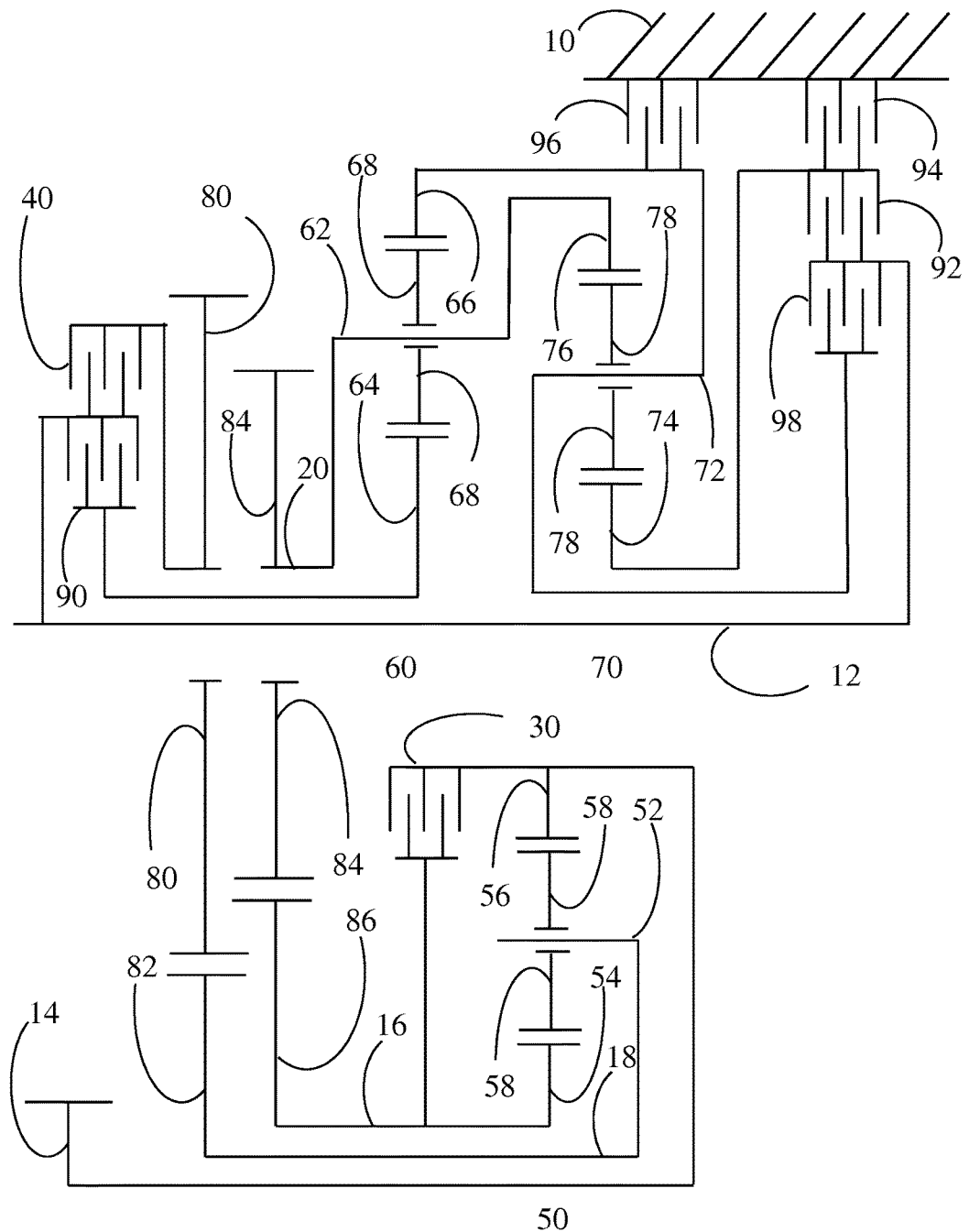
FIG. 1 is schematic view of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

An example transmission is schematically illustrated in FIG. 1. Transmission housing 10 is fixedly mounted with respect to the vehicle. Input 12 rotates about an input axis. Input 12 is driven by the vehicle engine, preferably via a launch device such as a torque converter that permits the engine to idle while the input 12 is stationary. Output 14 rotates about an output axis parallel to and offset from the input axis. Output 14 drives the vehicle wheels, preferably via a differential which may be located on another axis.

The transmission of FIG. 1 utilizes three simple planetary gear sets 50, 60, and 70. A planet carrier 52 rotates about the output axis and supports a set of planet gears 58 such that the planet gears rotate with respect to the planet carrier. External gear teeth on the planet gears mesh with external gear teeth on a sun gear 54 and with internal gear teeth on a ring gear 56. The sun gear and ring gear are supported to rotate about the output axis. Gear sets 60 and 70 are similarly structured except that the sun gears, carriers, and ring gears are supported for rotation about the input axis. A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship between the sun gear, the ring gear, and the planet carrier.

The transmission of FIG. 1 also utilizes two pairs of axis transfer gears. Axis transfer gears 80 and 84 are supported to rotate about the input axis while axis transfer gears 82 and 86 are supported for rotation about the output axis. Axis transfer gear 80 meshes with axis transfer gear 82 while axis transfer gear 84 meshes with axis transfer gear 86. Meshing axis transfer gears impose a fixed proportional speed relationship. The gear with a greater number of gear teeth will rotate slower than, and in the opposite direction from, the gear with fewer gear teeth. Illustrative ratios of gear teeth for each axis transfer gear set and each planetary gear set are listed in Table 1.

TABLE 1

| | |
|---|---|
| Gear 82/Gear 80 | 1.034 |
| Gear 86/Gear 84 | 1.593 |
| Ring 56/Sun 54 | 1.750 |
| Ring 66/Sun 64 | 1.816 |
| Ring 76/Sun 74 | 2.649 |

In the transmission of FIG. 1, axis transfer gear 86 is fixedly coupled to sun gear 54 by first shaft 16. Axis transfer gear 82 is fixedly coupled to carrier 52 by second shaft 18. Output 14 is fixedly coupled to ring gear 56. Axis transfer gear 84, carrier 62, and ring gear 76 are fixedly coupled by third shaft 20. Ring gear 66 is fixedly coupled to carrier 72. Shaft 16 is selectively coupled to output 12 by low clutch 30. Input 12 is selectively coupled to axis transfer gear 80 by high clutch 40 and selectively coupled to sun gear 64 by first clutch 90. Sun gear 74 is selectively coupled to input 12 by second clutch 92 and selectively held against rotation by first brake 94. Finally, the combination of ring gear 66 and carrier 72 is selectively held against rotation by second brake 96 and selectively coupled to input 12 by third clutch 98. The terms low clutch and high clutch are labels only and do not imply a physical location.

As shown in Table 2, engaging the shift elements in combinations of three establishes eleven forward speed ratios and one reverse speed ratio between input shaft 12 and output shaft 14. An X indicates that the shift element transmits torque in that speed ratio. An (X) indicates the clutch can be applied but is not required to establish the speed ratio. In 5th gear, clutches 30 and 40 establish the power flow path between input 12 and output 14. Any one of the remaining shift elements may also be applied. Applying clutch 98 in 5th gear ensures that all single and two step shifts from 5th gear can be accomplished by engaging only one shift element and releasing only one shift element. When the gear sets have tooth number ratios as indicated in Table 1, the speed ratios have the values indicated in Table 2. Note that the speed ratio is positive in reverse and negative in the forward ratios. An additional axis transfer gear pair between output 14 and the differential causes the wheels to rotate in the same direction as the input in forward and in the opposite direction in reverse.

TABLE 2

| | 30 | 40 | 90 | 92 | 94 | 96 | 98 | Ratio | Step |
|---|---|---|---|---|---|---|---|---|---|
| Rev | X | | | X | | X | | 4.22 | 94% |
| 1st | X | | X | | | X | | -4.49 | |
| 2nd | X | | X | | X | | | -2.39 | 1.88 |
| 3rd | X | | X | | | | X | -1.59 | 1.50 |
| 4th | X | | | | X | | X | -1.15 | 1.38 |
| 5th | X | X | | | | | (X) | -1.03 | 1.12 |
| 6th | | X | | | X | | X | -0.97 | 1.06 |
| 7th | | X | X | | | | X | -0.86 | 1.13 |
| 8th | | X | X | | X | | | -0.78 | 1.10 |
| 9th | | X | X | | | X | | -0.72 | 1.09 |
| 10th | | X | | | | X | X | -0.66 | 1.09 |
| 11th | | X | | X | | X | | -0.60 | 1.09 |

Various combinations of gear sets and shift elements impose particular speed relationships. The combination of planetary gear sets 60 and 70 and shift elements 90, 92, 94, 96, and 98 selectively impose a plurality of proportional speed relationships between input 12 and third shaft 20. Specifically, engaging the shift elements in various combinations of two imposes one reverse speed relationship, two underdrive speed relationships, a direct drive speed relationship, and one overdrive speed relationship. The combination of these components and axis transfer gears 84 and 86 selectively impose a plurality of speed relationships between input 12 and first shaft 16. Combining planetary gear set 50 imposes a fixed linear speed relationship among first shaft 16, second shaft 18, and output 14. The combination of high clutch 40 and axis transfer gears 80 and 82 selectively establish a proportional speed relationship between input 12 and second shaft 18. In other words, when clutch 40 is engaged, shaft 18 is constrained to rotate at a speed proportional to input 12.

Figure 2:
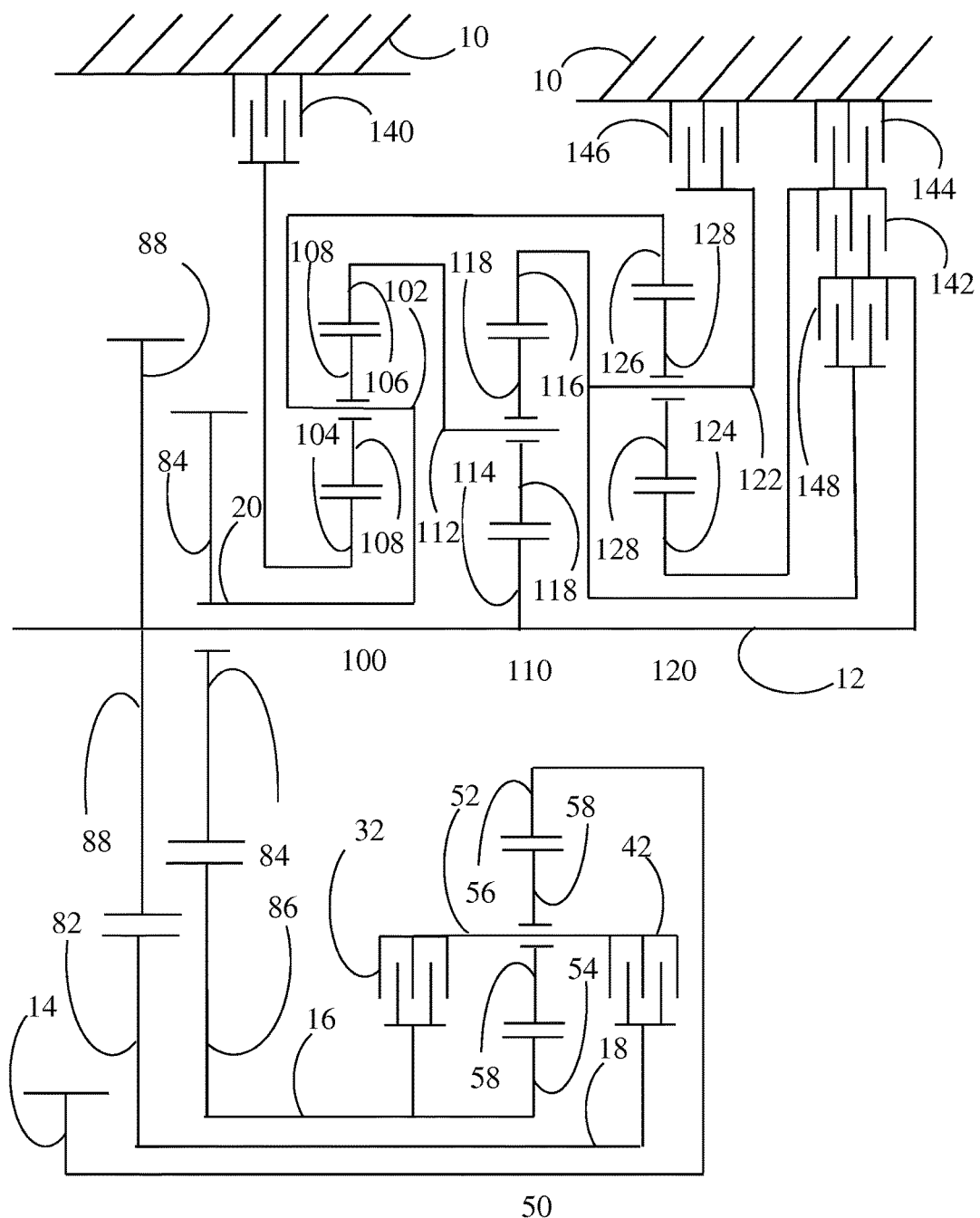
FIG. 2 is schematic view of a second transmission gearing arrangement.

Another example transmission is schematically illustrated in FIG. 2. The transmission of FIG. 2 utilizes four simple planetary gear sets 50, 100, 110, and 120 and two pairs of axis transfer gears, 88 and 82 and 84 and 86. Illustrative ratios of gear teeth for each axis transfer gear set and each planetary gear set are listed in Table 3.

TABLE 3

| | |
|---|---|
| Gear 82/Gear 88 | 1.000 |
| Gear 86/Gear 84 | 1.471 |
| Ring 56/Sun 54 | 2.500 |
| Ring 106/Sun 114 | 2.243 |
| Ring 116/Sun 114 | 2.171 |
| Ring 126/Sun 124 | 2.943 |

In the transmission of FIG. 2, axis transfer gear 86 is fixedly coupled to sun gear 54 by first shaft 16. Output 14 is fixedly coupled to ring gear 56. Axis transfer gear 88 and sun gear 114 are fixedly coupled to input 12. Axis transfer gear 84, carrier 102, and ring gear 126 are fixedly coupled by third shaft 20. Ring gear 106 is fixedly coupled to carrier 112. Ring gear 116 is fixedly coupled to carrier 122. Carrier 52 is selectively directly coupled to shaft 16 by low clutch 32 and selectively coupled to shaft 18 by high clutch 42. Sun gear 104 is selectively held against rotation by first brake 140. Sun gear 124 is selectively coupled to input 12 by first clutch 142 and selectively held against rotation by second brake 144. Finally, the combination of ring gear 116 and carrier 122 is selectively held against rotation by third brake 146 and selectively coupled to input 12 by second clutch 148.

As shown in Table 4, engaging the shift elements in combinations of three establishes fifteen forward speed ratios and one reverse speed ratio between input shaft 12 and output shaft 14. When the gear sets have tooth number ratios as indicated in Table 3, the speed ratios have the values indicated in Table 4. Note that the speed ratio is positive in reverse and negative in the forward ratios. An additional axis transfer gear pair between output 14 and the differential causes the wheels to rotate in the same direction as the input in forward and in the opposite direction in reverse.

TABLE 4

|  | 32 | 42 | 140 | 142 | 144 | 146 | 148 | Ratio | Step |
|---|---|---|---|---|---|---|---|---|---|
| Rev | X |  |  | X |  | X |  | 4.33 | 64% |
| 1$^{st}$ | X | X |  |  |  | X |  | −6.74 |  |
| 2$^{nd}$ | X | X |  |  | X |  |  | −4.36 | 1.55 |
| 3$^{rd}$ | X | X | X |  |  |  |  | −2.81 | 1.55 |
| 4$^{th}$ | X | X |  |  |  |  | X | −2.13 | 1.32 |
| 5$^{th}$ | X |  |  | X |  |  | X | −1.47 | 1.45 |
| 6$^{th}$ | X |  |  |  | X |  | X | −1.10 | 1.34 |
| 7$^{th}$ | X | X |  |  |  |  | X | −1.00 | 1.10 |
| 8$^{th}$ |  | X |  |  | X |  | X | −0.97 | 1.04 |
| 9$^{th}$ |  | X |  | X |  |  | X | −0.89 | 1.09 |
| 10$^{th}$ |  | X | X |  |  |  | X | −0.83 | 1.07 |
| 11$^{th}$ |  | X | X | X |  |  |  | −0.80 | 1.04 |
| 12$^{th}$ |  | X | X |  | X |  |  | −0.76 | 1.04 |
| 13$^{th}$ |  | X | X |  |  | X |  | −0.75 | 1.03 |
| 14$^{th}$ |  | X |  |  | X | X |  | −0.71 | 1.04 |
| 15$^{th}$ |  | X |  | X |  | X |  | −0.67 | 1.07 |

Various combinations of gear sets and shift elements impose particular speed relationships. The combination of planetary gear sets 100, 110, and 120 and shift elements 140, 142, 144, 146, and 148 selectively impose a plurality of proportional speed relationships between input 12 and third shaft 20. Specifically, engaging the shift elements in various combinations of two imposes one reverse speed relationship, four underdrive speed relationships, a direct drive speed relationship, and one overdrive speed relationship. The combination of these components and axis transfer gears 84 and 86 selectively impose a plurality of speed relationships between input 12 and first shaft 16. Axis transfer gears 80 and 82 establish a fixed proportional speed relationship between input 12 and second shaft 18. Combining planetary gear set 50, low clutch 32, and high clutch 42 collectively impose two selective speed relationships. First, when low clutch 32 is engaged, first shaft 16 is operatively coupled to output 14 because all of the elements of simple planetary gear set 50 rotate as a unit. Second, when high clutch 42 is engaged, a linear speed relationship is imposed among first shaft 16, second shaft 18, and output 14.

Figure 3:
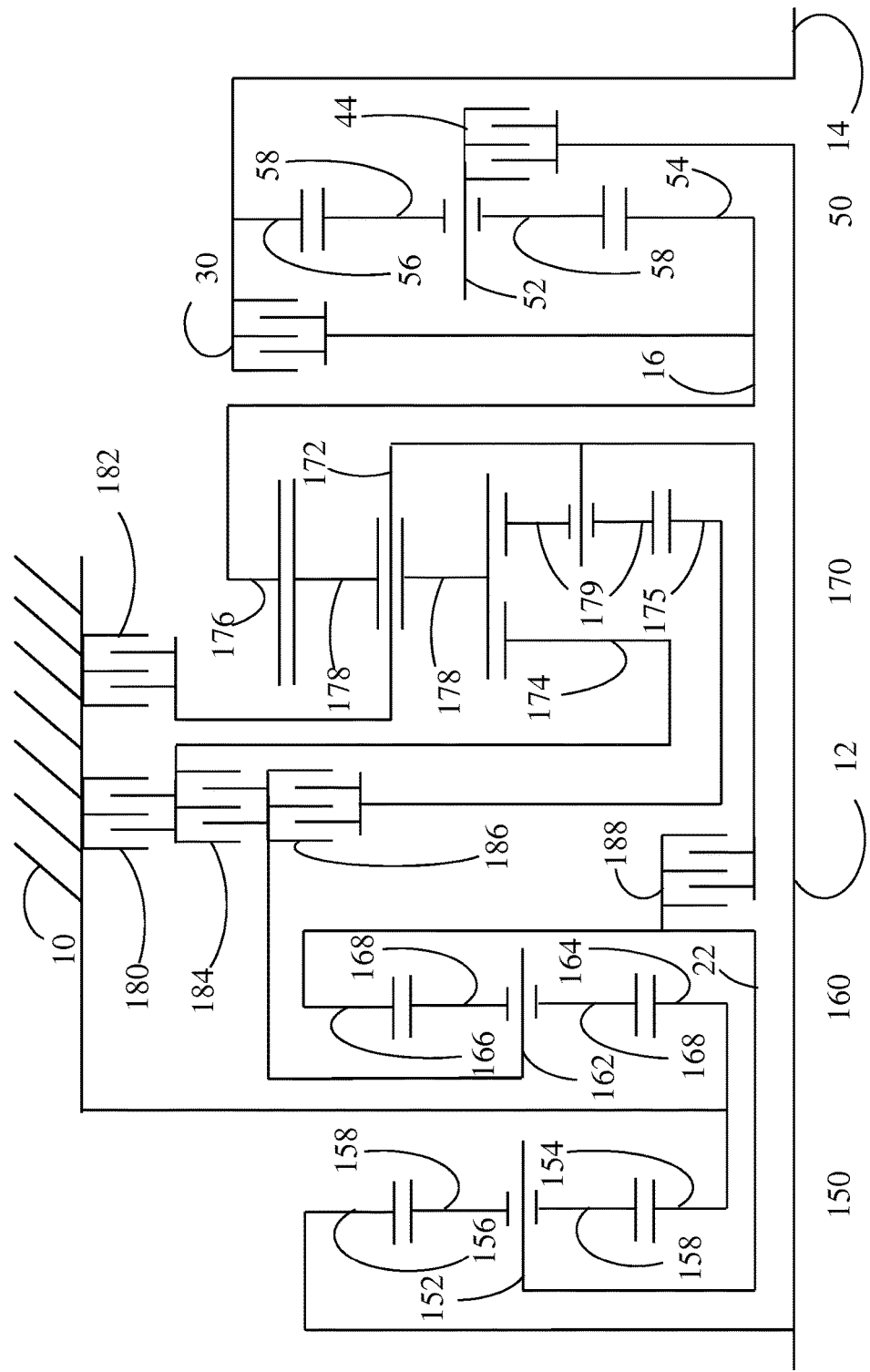
FIG. 3 is schematic view of a third transmission gearing arrangement.

Another example transmission is schematically illustrated in FIG. 3. In the transmission of FIG. 3, input 12 and output 14 rotate about a common axis. The transmission of FIG. 3 utilizes three simple planetary gear sets 50, 150, and 160 and a Ravigneaux gear set 170. Planet carrier 172 supports two set of planet gears. External gear teeth on long planet gears 178 mesh with external gear teeth on sun gear 174 and with internal gear teeth on ring gear 176. External gear teeth on short planet gears 179 mesh with external gear teeth on sun gear 175 and with the external gear teeth on the long planet gears 178. Carrier 172, sun gears 174 and 175, and ring gear 176 are each supported to rotate about a common axis. Ravigneaux gear set 170 imposes a fixed linear speed relationship among sun gear 174, planet carrier 172, ring gear 176, and sun 175. Other known types of gearing arrangements also impose a fixed linear speed relationship among four rotating elements. For example, two planetary gear sets, each either simple or double pinion type, wherein two elements of one gear set are fixedly coupled to two elements of the other gear set, collectively impose a fixed linear speed relationship between four shafts. Illustrative ratios of gear teeth for each gear set of FIG. 3 are listed in Table 5.

TABLE 5

| Ring 56/Sun 54 | 1.842 |
|---|---|
| Ring 156/Sun 154 | 1.634 |
| Ring 166/Sun 164 | 1.919 |
| Ring 176/Sun 174 | 2.237 |
| Ring 176/Sun 175 | 2.742 |

In the transmission of FIG. 3, sun gears 154 and 164 are fixedly held against rotation. Input 12 is fixedly coupled to ring gear 156. Carrier 152 is fixedly coupled to ring gear 166 by fourth shaft 22. Ring gear 176 is fixedly coupled to sun gear 54 by first shaft 16. Output 14 is fixedly coupled to ring gear 56 and selectively directly coupled to shaft 16 by low clutch 30. Carrier 52 is selectively coupled to input 12 by high clutch 44. Sun gear 174 is selectively held against rotation by first brake 180. Carrier 162 is selectively coupled to sun gear 174 by first clutch 184 and selectively coupled to sun gear 175 by second clutch 186. Finally, carrier 172 is selectively held against rotation by second brake 182 and selectively coupled to fourth shaft 22 by third clutch 188.

As shown in Table 6, engaging the shift elements in combinations of three establishes fifteen forward speed ratios and one reverse speed ratio between input shaft 12 and output shaft 14. When the gear sets have tooth number ratios as indicated in Table 5, the speed ratios have the values indicated in Table 6.

TABLE 6

|  | 30 | 44 | 180 | 182 | 184 | 186 | 188 | Ratio | Step |
|---|---|---|---|---|---|---|---|---|---|
| Rev | X |  |  | X | X |  |  | −5.49 | 82% |
| 1$^{st}$ | X |  |  | X |  | X |  | 6.72 |  |
| 2$^{nd}$ | X |  | X |  |  | X |  | 3.77 | 1.78 |
| 3$^{rd}$ | X |  |  |  | X | X |  | 2.45 | 1.54 |
| 4$^{th}$ | X |  |  |  |  | X | X | 1.84 | 1.33 |
| 5$^{th}$ | X |  |  |  | X |  | X | 1.40 | 1.32 |
| 6$^{th}$ | X |  | X |  |  |  | X | 1.11 | 1.26 |
| 7$^{th}$ | X | X |  |  |  |  | X | 1.00 | 1.11 |
| 8$^{th}$ |  | X | X |  |  |  | X | 0.95 | 1.06 |
| 9$^{th}$ |  | X |  |  | X |  | X | 0.87 | 1.09 |
| 10$^{th}$ |  | X |  |  |  | X | X | 0.80 | 1.08 |
| 11$^{th}$ |  | X |  |  | X | X |  | 0.76 | 1.06 |
| 12$^{th}$ |  | X | X |  |  | X |  | 0.72 | 1.06 |
| 13$^{th}$ |  | X |  | X |  | X |  | 0.68 | 1.05 |
| 14$^{th}$ |  | X | X | X |  |  |  | 0.65 | 1.06 |
| 15$^{th}$ |  | X |  | X | X |  |  | 0.61 | 1.06 |

Various combinations of gear sets and shift elements impose particular speed relationships. The combination of gear sets 160 and 170 and shift elements 180, 182, 184, 186, and 188 selectively impose a plurality of proportional speed relationships between fourth shaft 22 and first shaft 16. Specifically, engaging the shift elements in various combinations of two imposes one reverse speed relationship, four underdrive speed relationships, and two overdrive speed relationships. Gear set 150 establishes a fixed underdrive speed relationship between input 12 and fourth shaft 22. In combination, these components impose a plurality of speed relationships between input 12 and first shaft 16. Combining planetary gear set 50 and high clutch 44 collectively selectively establish a linear speed relationship among first shaft 16, input 12, and output 14.

Figure 4:
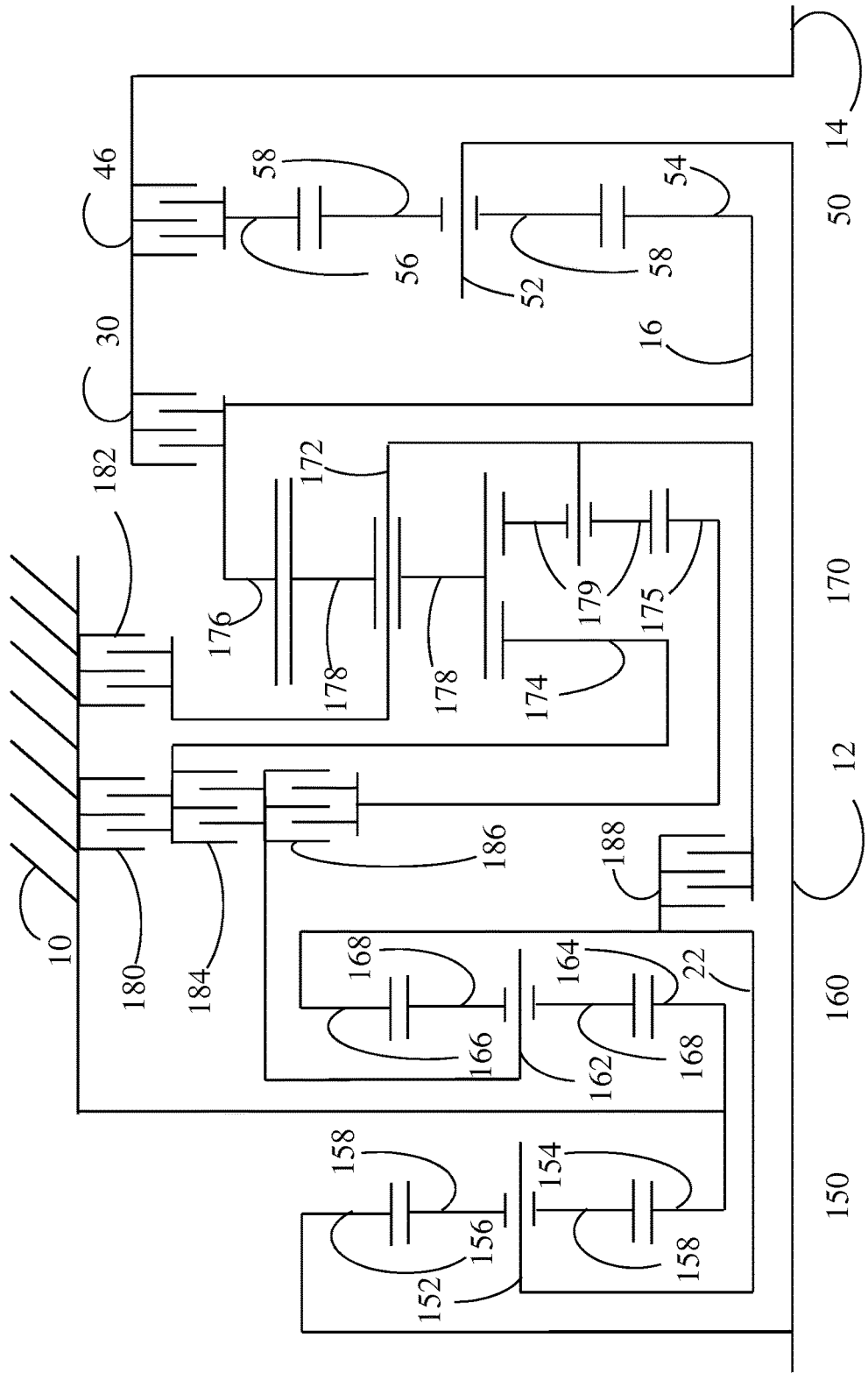
FIG. 4 is schematic view of a fourth transmission gearing arrangement.

Another example transmission is schematically illustrated in FIG. 4. The transmission of FIG. 4, like the transmission of FIG. 3, utilizes three simple planetary gear sets 50, 150, and 160 and a Ravigneaux gear set 170. Illustrative ratios of gear teeth for each gear set are listed in Table 5.

In the transmission of FIG. 4, sun gears 154 and 164 are fixedly held against rotation. Input 12 is fixedly coupled to ring gear 156 and fixedly coupled to carrier 52. Carrier 152 is fixedly coupled to ring gear 166 by fourth shaft 22. Ring gear 176 is fixedly coupled to sun gear 54 by first shaft 16. Output 14 is selectively directly coupled to shaft 16 by low clutch 30 and selectively coupled to ring gear 56 by high clutch 46. Sun gear 174 is selectively held against rotation by first brake 180. Carrier 162 is selectively coupled to sun gear 174 by first clutch 184 and selectively coupled to sun gear 175 by second clutch 186. Finally, carrier 172 is selectively held against rotation by second brake 182 and selectively coupled to fourth shaft 22 by third clutch 188.

As shown in Table 7, engaging the shift elements in combinations of three establishes fifteen forward speed ratios and one reverse speed ratio between input shaft 12 and output shaft 14. When the gear sets have tooth number ratios as indicated in Table 5, the speed ratios have the values indicated in Table 7.

TABLE 7

|  | 30 | 46 | 180 | 182 | 184 | 186 | 188 | Ratio | Step |
|---|---|---|---|---|---|---|---|---|---|
| Rev | X |  |  | X | X |  |  | −5.49 | 82% |
| 1st | X |  |  | X |  | X |  | 6.72 |  |
| 2nd | X |  | X |  |  | X |  | 3.77 | 1.78 |
| 3rd | X |  |  |  | X | X |  | 2.45 | 1.54 |
| 4th | X |  |  |  |  | X | X | 1.84 | 1.33 |
| 5th | X |  |  |  | X |  | X | 1.40 | 1.32 |
| 6th | X |  | X |  |  |  | X | 1.11 | 1.26 |
| 7th | X | X |  |  |  |  | X | 1.00 | 1.11 |
| 8th |  | X | X |  |  |  | X | 0.95 | 1.06 |
| 9th |  | X |  |  | X |  | X | 0.87 | 1.09 |
| 10th |  | X |  |  |  | X | X | 0.80 | 1.08 |
| 11th |  | X |  |  | X | X |  | 0.76 | 1.06 |
| 12th |  | X | X |  |  | X |  | 0.72 | 1.06 |
| 13th |  | X |  | X |  | X |  | 0.68 | 1.05 |
| 14th |  | X | X | X |  |  |  | 0.65 | 1.06 |
| 15th |  | X |  | X | X |  |  | 0.61 | 1.06 |

Various combinations of gear sets and shift elements impose particular speed relationships. The combination of gear sets 160 and 170 and shift elements 180, 182, 184, 186, and 188 selectively impose a plurality of proportional speed relationships between fourth shaft 22 and first shaft 16. Specifically, engaging the shift elements in various combinations of two imposes one reverse speed relationship, four underdrive speed relationships, and two overdrive speed relationships. Gear set 150 establishes a fixed underdrive speed relationship between input 12 and fourth shaft 22. In combination, these components impose a plurality of speed relationships between input 12 and first shaft 16. Gear sets 150 and 160 collectively establish fixed proportional speed relationships among i) carrier 162, ii) the combination of carrier 152 and ring gear 166, and iii) ring gear 156 such that ring gear 156 rotates faster than the other two and carrier 162 rotates slower than the other two. Combining planetary gear set 50 and high clutch 46 collectively selectively establish a linear speed relationship among first shaft 16, input 12, and output 14.

Figure 5:
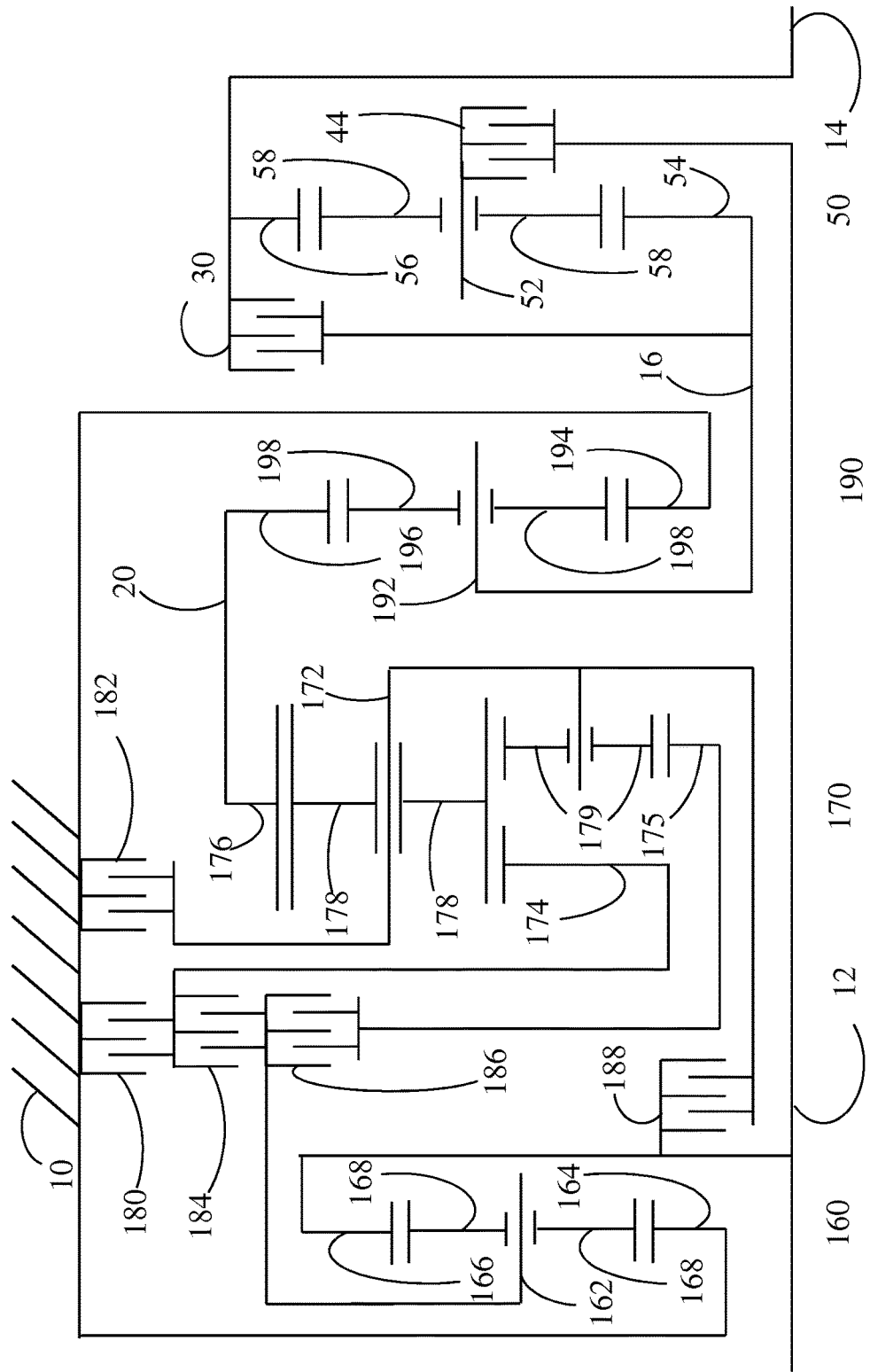
FIG. 5 is schematic view of a fifth transmission gearing arrangement.

Another example transmission is schematically illustrated in FIG. 5. The transmission of FIG. 5 utilizes three simple planetary gear sets 50, 160, and 190 and a Ravigneaux gear set 170. Illustrative ratios of gear teeth for each gear set of FIG. 5 are listed in Table 8.

TABLE 8

| Ring 56/Sun 54 | 1.842 |
|---|---|
| Ring 166/Sun 164 | 1.919 |
| Ring 176/Sun 174 | 2.237 |
| Ring 176/Sun 175 | 2.742 |
| Ring 196/Sun 194 | 1.634 |

In the transmission of FIG. 5, sun gears 164 and 194 are fixedly held against rotation. Input 12 is fixedly coupled to ring gear 166. Ring gear 176 is fixedly coupled to ring gear 196 by third shaft 20. Carrier 192 is fixedly coupled to sun gear 54 by first shaft 16. Output 14 is fixedly coupled to ring gear 56 and selectively directly coupled to shaft 16 by low clutch 30. Carrier 52 is selectively coupled to input 12 by high clutch 44. Sun gear 174 is selectively held against rotation by first brake 180. Carrier 162 is selectively coupled to sun gear 174 by first clutch 184 and selectively coupled to sun gear 175 by second clutch 186. Finally, carrier 172 is selectively held against rotation by second brake 182 and selectively coupled to input 12 by third clutch 188.

As shown in Table 6, engaging the shift elements in combinations of three establishes fifteen forward speed ratios and one reverse speed ratio between input shaft 12 and output shaft 14. When the gear sets have tooth number ratios as indicated in Table 8, the speed ratios have the values indicated in Table 6.

Various combinations of gear sets and shift elements impose particular speed relationships. The combination of gear sets 160 and 170 and shift elements 180, 182, 184, 186, and 188 selectively impose a plurality of proportional speed relationships between input 12 and third shaft 20. Specifically, engaging the shift elements in various combinations of two imposes one reverse speed relationship, four underdrive speed relationships, and two overdrive speed relationships. Gear set 190 establishes a fixed underdrive speed relationship between third shaft 20 and first shaft 16. In combination, these components impose a plurality of speed relationships between input 12 and first shaft 16. Combining planetary gear set 50 and high clutch 44 collectively selectively establish a linear speed relationship among first shaft 16, input 12, and output 14.

Figure 6:
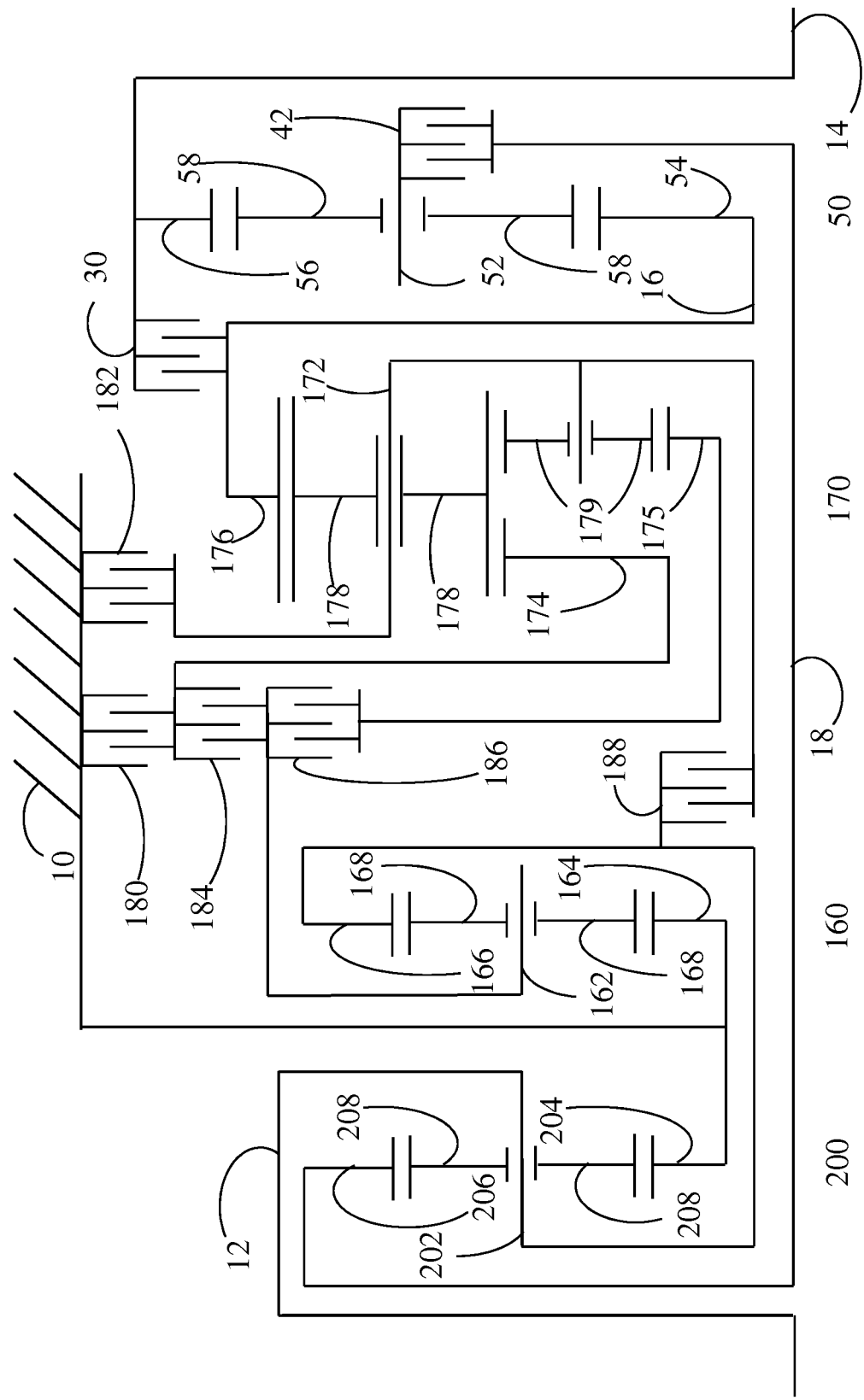
FIG. 6 is schematic view of a sixth transmission gearing arrangement.

Another example transmission is schematically illustrated in FIG. 6. The transmission of FIG. 6 utilizes three simple planetary gear sets 50, 160, and 200 and a Ravigneaux gear set 170. Illustrative ratios of gear teeth for each gear set of FIG. 6 are listed in Table 9.

TABLE 9

| Ring 56/Sun 54 | 1.842 |
|---|---|
| Ring 166/Sun 164 | 1.919 |
| Ring 176/Sun 174 | 2.237 |
| Ring 176/Sun 175 | 2.742 |
| Ring 206/Sun 204 | 1.634 |

In the transmission of FIG. 6, sun gears 164 and 204 are fixedly held against rotation. Input 12 is fixedly coupled to carrier 202 and to ring gear 166. Second shaft 18 is fixedly coupled to ring gear 206. Ring gear 176 is fixedly coupled to sun gear 54 by first shaft 16. Output 14 is fixedly coupled to ring gear 56 and selectively directly coupled to shaft 16 by low clutch 30. Carrier 52 is selectively coupled to second shaft 18 by high clutch 42. Sun gear 174 is selectively held against rotation by first brake 180. Carrier 162 is selectively coupled to sun gear 174 by first clutch 184 and selectively coupled to sun gear 175 by second clutch 186. Finally, carrier 172 is selectively held against rotation by second brake 182 and selectively coupled to input 12 by third clutch 188.

As shown in Table 10, engaging the shift elements in combinations of three establishes fifteen forward speed ratios and one reverse speed ratio between input shaft 12 and output shaft 14. When the gear sets have tooth number ratios as indicated in Table 9, the speed ratios have the values indicated in Table 10.

TABLE 10

|  | 30 | 42 | 180 | 182 | 184 | 186 | 188 | Ratio | Step |
|---|---|---|---|---|---|---|---|---|---|
| Rev | X |  |  | X | X |  |  | −3.40 | 82% |
| 1st | X |  |  | X |  | X |  | 4.17 |  |
| 2nd | X |  | X |  |  | X |  | 2.34 | 1.78 |
| 3rd | X |  |  |  | X | X |  | 1.52 | 1.54 |
| 4th | X |  |  |  | X |  | X | 1.14 | 1.33 |
| 5th | X |  |  | X |  |  | X | 0.87 | 1.32 |
| 6th | X |  | X |  |  |  | X | 0.69 | 1.26 |
| 7th | X | X |  |  |  |  | X | 0.62 | 1.11 |
| 8th |  | X | X |  |  |  | X | 0.59 | 1.06 |
| 9th |  | X |  |  | X |  | X | 0.54 | 1.09 |
| 10th |  | X |  |  |  | X | X | 0.50 | 1.08 |
| 11th |  | X |  |  | X | X |  | 0.47 | 1.06 |
| 12th |  | X | X |  |  | X |  | 0.44 | 1.06 |
| 13th |  | X |  | X |  | X |  | 0.42 | 1.05 |
| 14th |  | X | X | X |  |  |  | 0.40 | 1.06 |
| 15th |  | X |  | X | X |  |  | 0.38 | 1.06 |

Various combinations of gear sets and shift elements impose particular speed relationships. The combination of gear sets 160 and 170 and shift elements 180, 182, 184, 186, and 188 selectively impose a plurality of proportional speed relationships between input 12 and first shaft 16. Specifically, engaging the shift elements in various combinations of two imposes one reverse speed relationship, four underdrive speed relationships, and two overdrive speed relationships. Gear set 200 establishes a fixed overdrive speed relationship between input 12 and second shaft 18. Gear sets 200 and 160 collectively establish fixed proportional speed relationships among i) carrier 162, ii) the combination of input 12, carrier 202, and ring gear 166, and iii) ring gear 206 such that ring gear 206 rotates faster than the other two and carrier 162 rotates slower than the other two. Combining planetary gear set 50 and high clutch 42 collectively selectively establish a linear speed relationship among first shaft 16, second shaft 18, and output 14.

Figure 7:
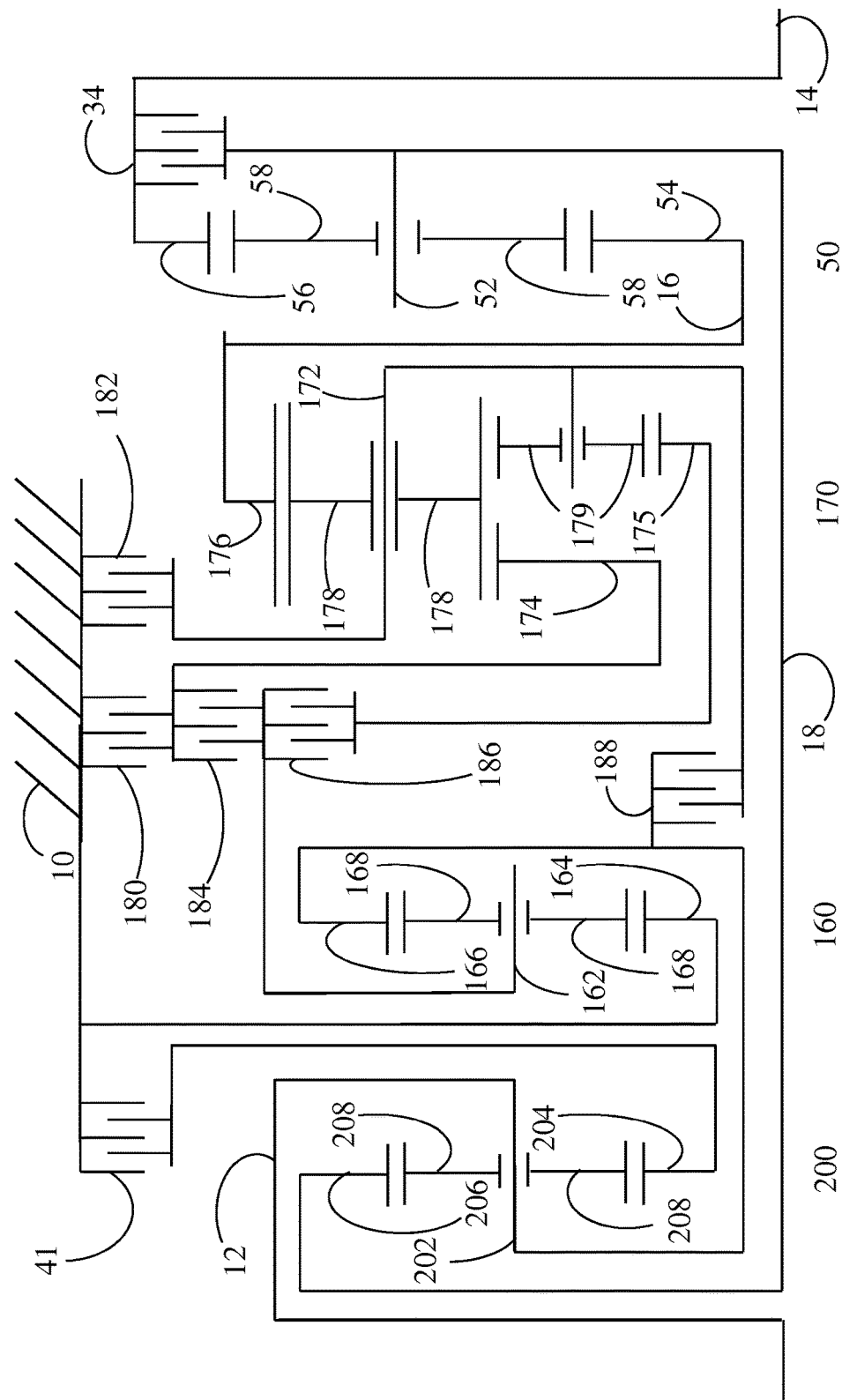
FIG. 7 is schematic view of a seventh transmission gearing arrangement.

Another example transmission is schematically illustrated in FIG. 7. The transmission of FIG. 7 utilizes three simple planetary gear sets 50, 160, and 200 and a Ravigneaux gear set 170. Illustrative ratios of gear teeth for each gear set of FIG. 7 are listed in Table 9.

In the transmission of FIG. 7, sun gear 164 is fixedly held against rotation. Input 12 is fixedly coupled to carrier 202 and to ring gear 166. Ring gear 206 is fixedly coupled to carrier 52 by second shaft 18. Ring gear 176 is fixedly coupled to sun gear 54 by first shaft 16. Output 14 is fixedly coupled to ring gear 56 and selectively coupled to carrier 52 by low clutch 34. Sun gear 204 is selectively held against rotation by high brake 41. Sun gear 174 is selectively held against rotation by first brake 180. Carrier 162 is selectively coupled to sun gear 174 by first clutch 184 and selectively coupled to sun gear 175 by second clutch 186. Finally, carrier 172 is selectively held against rotation by second brake 182 and selectively coupled to input 12 by third clutch 188.

As shown in Table 11, engaging the shift elements in combinations of three establishes fifteen forward speed ratios and one reverse speed ratio between input shaft 12 and output shaft 14. When the gear sets have tooth number ratios as indicated in Table 9, the speed ratios have the values indicated in Table 11.

TABLE 11

|  | 34 | 41 | 180 | 182 | 184 | 186 | 188 | Ratio | Step |
|---|---|---|---|---|---|---|---|---|---|
| Rev | X |  |  | X | X |  |  | −3.40 | 82% |
| 1st | X |  |  | X |  | X |  | 4.17 |  |
| 2nd | X |  | X |  |  | X |  | 2.34 | 1.78 |
| 3rd | X |  |  |  | X | X |  | 1.52 | 1.54 |
| 4th | X |  |  |  | X |  | X | 1.14 | 1.33 |
| 5th | X |  |  | X |  |  | X | 0.87 | 1.32 |
| 6th | X |  | X |  |  |  | X | 0.69 | 1.26 |
| 7th | X | X |  |  |  |  | X | 0.62 | 1.11 |
| 8th |  | X | X |  |  |  | X | 0.59 | 1.06 |
| 9th |  | X |  |  | X |  | X | 0.54 | 1.09 |
| 10th |  | X |  |  |  | X | X | 0.50 | 1.08 |
| 11th |  | X |  |  | X | X |  | 0.47 | 1.06 |
| 12th |  | X | X |  |  | X |  | 0.44 | 1.06 |
| 13th |  | X |  | X |  | X |  | 0.42 | 1.05 |
| 14th |  | X | X | X |  |  |  | 0.40 | 1.06 |
| 15th |  | X |  | X | X |  |  | 0.38 | 1.06 |

Various combinations of gear sets and shift elements impose particular speed relationships. The combination of gear sets 160 and 170 and shift elements 180, 182, 184, 186, and 188 selectively impose a plurality of proportional speed relationships between input 12 and first shaft 16. Specifically, engaging the shift elements in various combinations of two imposes one reverse speed relationship, four underdrive speed relationships, and two overdrive speed relationships. Gear set 200 and high brake 41 selectively establish an overdrive speed relationship between input 12 and second shaft 18. Combining planetary gear set 50 and low clutch 34 collectively selectively couple output 14 to first shaft 16.

Figure 8:
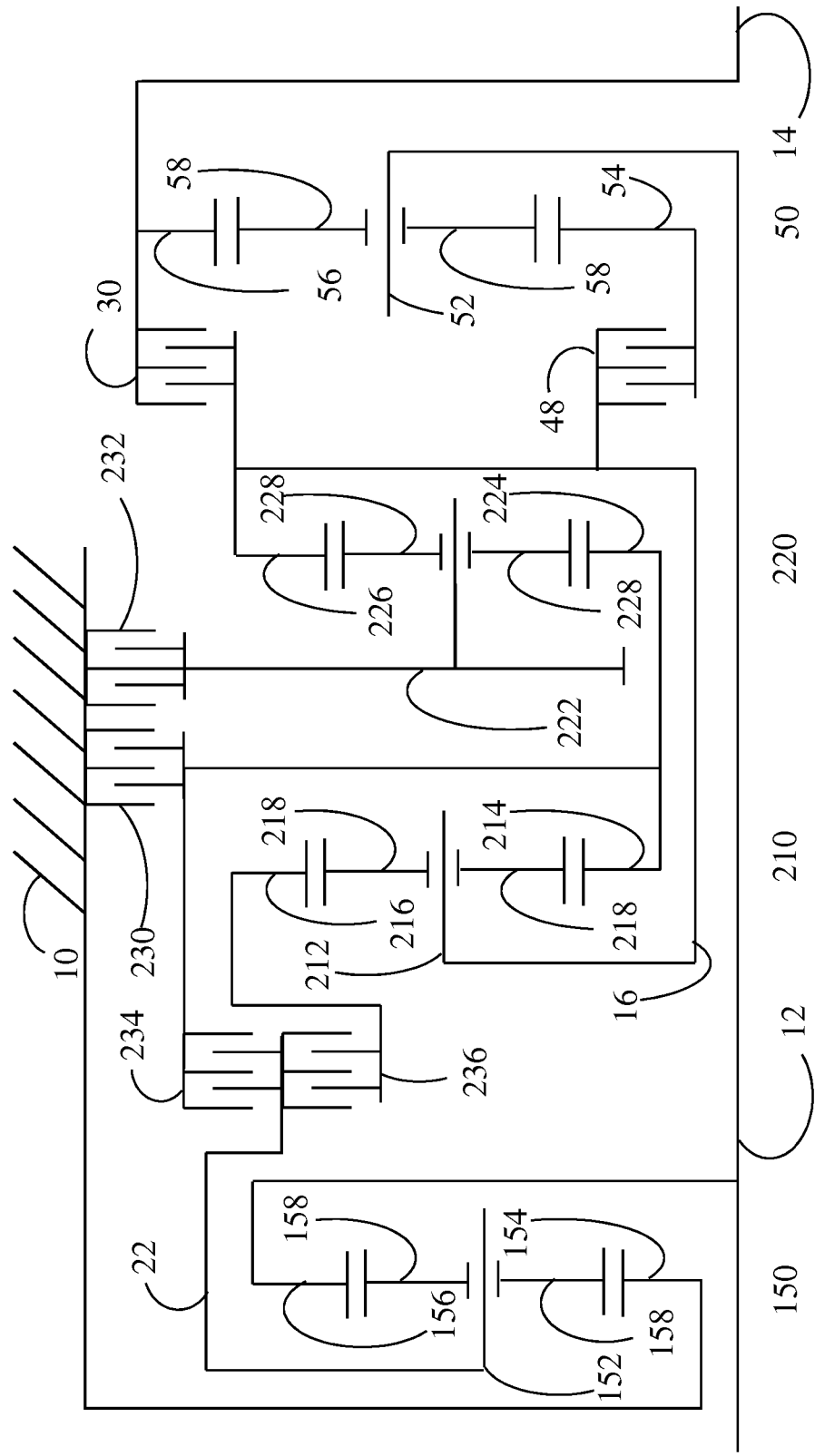
FIG. 8 is schematic view of an eighth transmission gearing arrangement.

Another example transmission is schematically illustrated in FIG. 8. The transmission of FIG. 8 utilizes four simple planetary gear sets 50, 150, 210, and 220. Illustrative ratios of gear teeth for each gear set of FIG. 8 are listed in Table 12.

TABLE 12

| Ring 56/Sun 54 | 1.500 |
|---|---|
| Ring 156/Sun 154 | 3.000 |
| Ring 216/Sun 215 | 2.400 |
| Ring 226/Sun 224 | 2.200 |

In the transmission of FIG. 8, sun gear 154 is fixedly held against rotation. Input 12 is fixedly coupled to ring gear 156 and to carrier 52. Carrier 212 is fixedly coupled to ring gear 226 by first shaft 16. Fourth shaft 22 is fixedly coupled to carrier 152. Output 14 is fixedly coupled to ring gear 56 and selectively directly coupled to shaft 16 by low clutch 30. Sun gear 54 is selectively coupled to first shaft 16 by high clutch 48. Sun gear 214 and sun gear 224 are selectively held against rotation by first brake 230 and selectively coupled to fourth shaft 22 by first clutch 234. Carrier 222 is selectively held against rotation by second brake 232. Finally, fourth shaft 22 is selectively coupled to ring gear 216 by second clutch 236.

As shown in Table 13, engaging the shift elements in combinations of three establishes nine forward speed ratios and one reverse speed ratio between input shaft 12 and output shaft 14. When the gear sets have tooth number ratios as indicated in Table 12, the speed ratios have the values indicated in Table 13.

TABLE 13

|  | 30 | 48 | 230 | 232 | 234 | 236 | Ratio | Step |
|---|---|---|---|---|---|---|---|---|
| Rev | X |  |  | X | X |  | -2.93 | 94% |
| 1st | X |  |  | X |  | X | 3.11 |  |
| 2nd | X |  | X |  |  | X | 1.89 | 1.65 |
| 3rd | X |  |  |  | X | X | 1.33 | 1.42 |
| 4th | X | X |  |  |  | X | 1.00 | 1.33 |
| 5th |  | X |  |  | X | X | 0.86 | 1.17 |
| 6th |  | X | X |  |  | X | 0.76 | 1.13 |
| 7th |  | X |  | X |  | X | 0.69 | 1.11 |
| 8th |  | X | X | X |  |  | 0.60 | 1.15 |
| 9th |  | X |  | X | X |  | 0.53 | 1.14 |

Various combinations of gear sets and shift elements impose particular speed relationships. The combination of gear sets 210 and 220 and shift elements 230, 232, 234, and 236 selectively impose a plurality of proportional speed relationships between fourth shaft 22 and first shaft 16. Specifically, engaging the shift elements in various combinations of two imposes one reverse speed relationship, two underdrive speed relationships, and a direct drive speed relationship. Gear set 150 establishes a fixed underdrive speed relationship between input 12 and fourth shaft 22. In combination, these components impose a plurality of speed relationships between input 12 and first shaft 16. Combining planetary gear set 50 and high clutch 48 collectively selectively establish a linear speed relationship among first shaft 16, input 12, and output 14.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input;
   an output;
   a first shaft;
   a first gearing arrangement configured to impose a plurality of selective proportional speed relationships between the first shaft and the input;
   a second gearing arrangement configured to selectively impose a linear speed relationship among the first shaft, the input, and the output; and
   a first clutch configured to selectively directly couple the output to one of the first shaft and the input.

2. The transmission of claim 1 wherein the first gearing arrangement comprises:
   a first simple planetary gearset having a first sun fixedly held against rotation, a first ring fixedly coupled to the input, and a first carrier;
   a second simple planetary gearset having a second sun fixedly held against rotation, a second ring fixedly coupled to the first carrier, and a second carrier;
   a Ravigneaux gearset having a third sun, a fourth sun, a third ring fixedly coupled to the first shaft, and a third carrier;
   a second clutch configured to selectively couple the first carrier to the third carrier;
   a third clutch configured to selectively couple the second carrier to the fourth sun;
   a fourth clutch configured to selectively couple the second carrier to the third sun;
   a first brake configured to selectively hold the third sun against rotation; and
   a second brake configured to selectively hold the third carrier against rotation.

3. The transmission of claim 1 wherein the first gearing arrangement comprises:
   a first simple planetary gearset having a first sun fixedly held against rotation, a first ring fixedly coupled to the input, and a first carrier;
   a second simple planetary gearset having a second sun fixedly held against rotation, a second ring, and a second carrier fixedly coupled to the first shaft;
   a Ravigneaux gearset having a third sun, a fourth sun, a third ring fixedly coupled to the second ring, and a third carrier;
   a second clutch configured to selectively couple the input to the third carrier;
   a third clutch configured to selectively couple the first carrier to the fourth sun;
   a fourth clutch configured to selectively couple the first carrier to the third sun;
   a first brake configured to selectively hold the third sun against rotation; and
   a second brake configured to selectively hold the third carrier against rotation.

4. The transmission of claim 1 wherein the first gearing arrangement comprises:
   a first simple planetary gearset having a first sun fixedly held against rotation, a first ring fixedly coupled to the input, and a first carrier;
   a second simple planetary gearset having a second sun, a second ring, and a second carrier fixedly coupled to the first shaft;
   a third simple planetary gearset having a third sun fixedly coupled to the second sun, a third ring fixedly coupled to the first shaft, and a third carrier;
   a second clutch configured to selectively couple the first carrier to the second sun;
   a third clutch configured to selectively couple the first carrier to the second ring;
   a first brake configured to selectively hold the second sun against rotation; and
   a second brake configured to selectively hold the third carrier against rotation.

5. The transmission of claim 1 wherein the second gearing arrangement comprises:
   a simple planetary gearset having a sun fixedly coupled to the first shaft, a ring fixedly coupled to the output, and a carrier; and
   a second clutch configured to selectively couple the input to the carrier.

6. The transmission of claim 1 wherein the second gearing arrangement comprises:
- a simple planetary gearset having a sun fixedly coupled to the first shaft, a ring, and a carrier fixedly coupled to the input; and
- a second clutch configured to selectively couple the output to the ring.

7. The transmission of claim 1 wherein the second gearing arrangement comprises:
- a simple planetary gearset having a sun, a ring fixedly coupled to the output, and a carrier fixedly coupled to the input; and
- a second clutch configured to selectively couple the first shaft to the sun.

8. A transmission comprising:
- a first gearing arrangement configured to fixedly constrain first and second shafts to rotate slower than an input; and
- a Ravigneaux gearset having a Ravigneaux carrier selectively coupled to the first shaft and selectively held against rotation, a first Ravigneaux sun selectively coupled to the second shaft and selectively held against rotation, a second Ravigneaux sun selectively coupled to the second shaft, and a Ravigneaux ring.

9. The transmission of claim 8 wherein the first gearing arrangement comprises:
- a first simple planetary gearset having a first sun fixedly held against rotation, a first ring fixedly coupled to the input, and a first carrier fixedly coupled to the first shaft; and
- a second simple planetary gearset having a second sun fixedly held against rotation, a second ring fixedly coupled to the first shaft, and a second carrier fixedly coupled to the second shaft.

10. The transmission of claim 8 further comprising:
- a second gearing arrangement configured to impose a selective linear speed relationship among the Ravigneaux ring, the input, and an output; and
- a clutch configured to operatively selectively couple the Ravigneaux ring to the output.

11. The transmission of claim 10 wherein the second gearing arrangement comprises a simple planetary gearset having a sun fixedly coupled to the Ravigneaux ring, a ring fixedly coupled to the output, and a carrier selectively coupled to the input.

12. The transmission of claim 10 wherein the second gearing arrangement comprises a simple planetary gearset having a sun fixedly coupled to the Ravigneaux ring, a ring selectively coupled to the output, and a carrier fixedly coupled to the input.

* * * * *